United States Patent [19]

Enger

[11] 4,051,694

[45] Oct. 4, 1977

[54] EVAPORATIVE PRECOOLER FOR AN ABSORPTION REFRIGERATING APPARATUS

[75] Inventor: Lars Sivert Enger, Bandhagen, Sweden

[73] Assignee: Aktiebolaget Electrolux, Stockholm, Sweden

[21] Appl. No.: 699,219

[22] Filed: June 24, 1976

[30] Foreign Application Priority Data

June 30, 1975 Sweden .............................. 7507432

[51] Int. Cl.² ............................................. F25B 15/10
[52] U.S. Cl. .................................................... 62/490
[58] Field of Search ................ 62/490, 491, 492, 493, 62/110, 111

[56] References Cited

U.S. PATENT DOCUMENTS 3,715,896  2/1973  Eber ........................................ 62/490

Primary Examiner—Lloyd L. King
Attorney, Agent, or Firm—Alfred E. Miller

[57] ABSTRACT

An absorption refrigerating apparatus of the type operating with a pressure equalizing inert gas and having an evaporative precooler for the refrigerant condensate supplied to the evaporator system of the apparatus. The evaporative precooler is constructed in a manner whereby two parallel flow paths are formed that are spaced from one another, but heat-conductively connected together. One of the flow paths is for the partial flow of weak gas while the other flow path is for the refrigerant condensate.

9 Claims, 4 Drawing Figures

EVAPORATIVE PRECOOLER FOR AN ABSORPTION REFRIGERATING APPARATUS

BACKGROUND OF THE INVENTION

Absorption refrigerating apparatus are known, some of which are provided with precoolers. The use of an evaporative precooler in a refrigerator is known to have certain thermodynamic advantages, however, these advantages are particularly evident under normal operating conditions of the apparatus. On the other hand, when the apparatus is cold when starting up difficulties arise with an apparatus having a precooler. Furthermore, if the apparatus works under varying conditions, disturbances may occur in the operation of the apparatus when the ambient temperature is high. However, if it is desired to overcome the above disadvantages and to supply a precooler of outstanding thermodynamic quality, the manufacture of a refrigerating apparatus will be complicated and the apparatus itself sensitive to varying operating conditions which may result in the disturbance of the precooling. This disturbance may occur especially when precooling is most needed.

It is a principal object of the present invention to provide an absorption refrigeration apparatus with a precooler in which the latter includes two parallel flow paths separated from but heat-conductively connected to one another, and means provided to raise the condensate in one of the flow paths to the gas conduit and to moisten the inner wall of the conduit with the condensate.

It is another object of the present invention to provide interior grooves in the precooler for providing a large moistened area of the pipe wall in the upper channel and a large contact surface for gas and liquid. Furthermore, the interior grooves also prevent the forming of liquid plugs in the precooler.

It is a further object of the present invention to provide a precooling device in which precooling takes place in two stages. The dimensions of the precooler are so chosen that the evaporation area is determined whereby it is possible to operate the apparatus with balanced temperatures of condensate and rich gas mixture before the latter leaves the precooler.

In order that the invention will be more clearly understood, it will now be disclosed in greater detail with reference to the accompanying drawings, in which.

DESCRIPTION OF THE PREFERRED EMBODIMENT OF THE INVENTION

Figure 1:
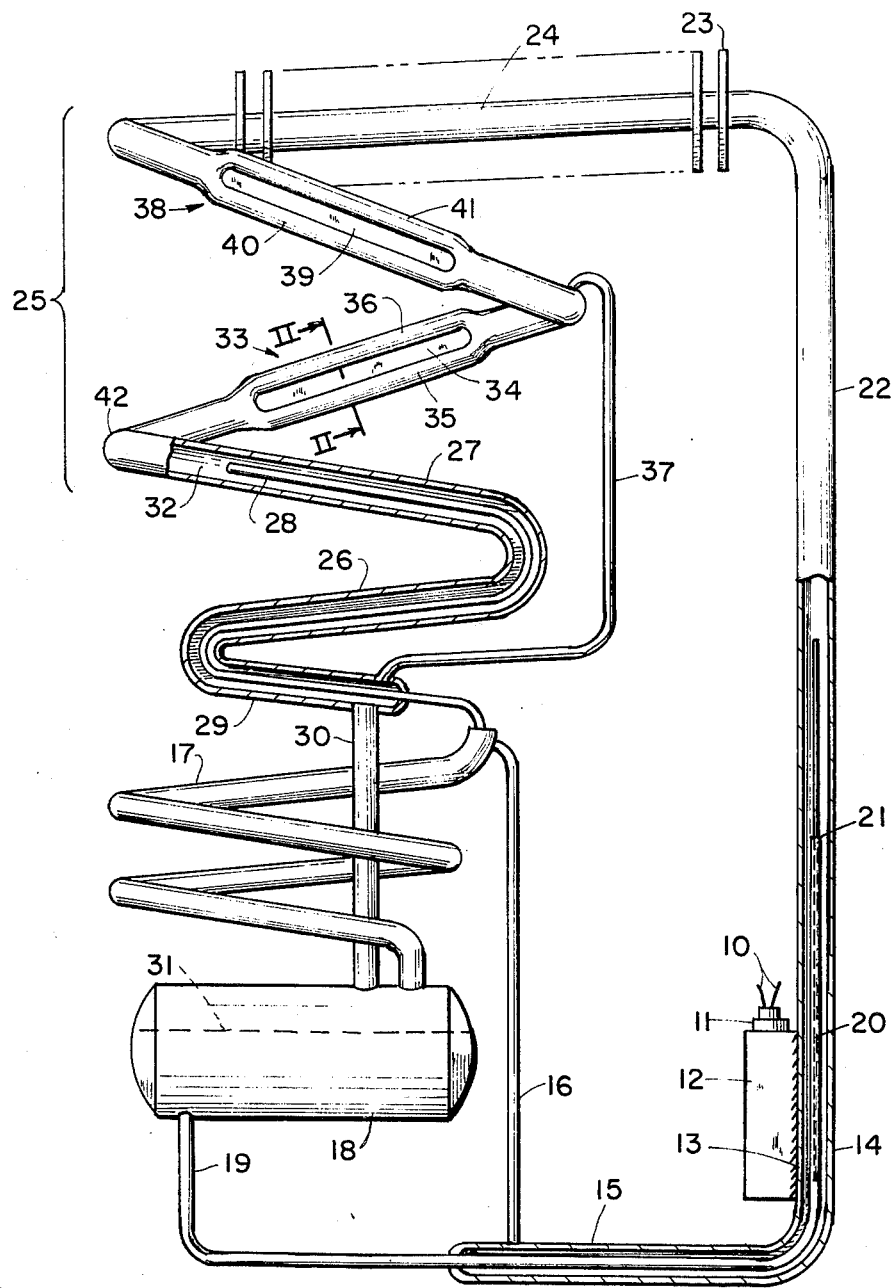
FIG. 1 is a diagrammatic view of an absorption refrigerating apparatus having an evaporative precooler constructed in accordance with the teachings of the present invention and in which the parts of said apparatus are spread in one plane for purposes of clarity.

Referring to FIG. 1 in which a refrigerating apparatus is shown of the type charged with water, ammonia and hydrogen as absorption solution, refrigerant and pressure-equalizing inert gas, respectively. Under normal cold generation the apparatus operates in known manner and can be controlled by a thermostat (not shown) which, depending upon the cooling need, closes an electric circuit through wires 10 to an electric heating cartridge 11 positioned within a metal sleeve 12 and along a line 13 is heat-conductively connected to a boiler 14. The outer boiler tube contains absorption solution, which is weak in refrigerant and by an outer tube 15 of the liquid heat exchanger and a conduit 16 is conducted to the upper part of the absorber 17 from which the solution flows in a downward direction while absorbing refrigerant vapor from a rising rich mixture of refrigerant vapor and inert gas. When the solution has passed through the absorber 17, in which it is enriched in refrigerant, it is collected in an absorber vessel 18 and then supplied by a conduit 19, which also forms the inner conduit of the liquid heat exchanger, to the liquid circulating pump 20 disposed concentrically in a vertical part of the conduit 19, whose upper end 21 is closed.

Vapor expelled from the pump 20 and from the boiler 14 is conducted by a vapor conduit 22 to the condenser 24 having fins 23. The refrigerant condensate produced in the condenser 24 is conducted by a condensate conduit referred to generally by the numeral 25 to an inlet situated at the highest point of the evaporator system, which is formed by evaporator parts 26, 27. Weak inert gas is supplied at the same place from the absorber 17, which has been precooled in an inner conduit 28 of the evaporator system. Refrigerant and weak gas flow in parallel through the outer conduit of the evaporator part 27, which is the low temperature evaporator, and then through the evaporator part 26, which is the high temperature evaporator, and further through a gas heat exchanger 29, and subsequently are supplied by a conduit 30 to the vapor space 31 in the absorber vessel 18, from which the gas is conducted upwardly through the absorber 17.

Figure 2:
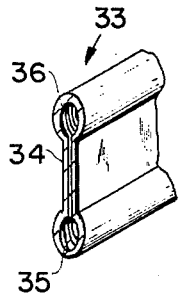
FIG. 2 is a perspective view of a detailed construction shown in FIG. 1 taken along the lines II—II of FIG. 1.

The condensate conduit 25 extends from the lower end of the condenser 24 to the upper end of the evaporator part 27. The inner conduit 28 for inert gas extends into the upper evaporator part which is weak in refrigerant. The condensate conduit 25 has approximately the same inclination relative to the horizontal plane as the other conduits in the apparatus, through which both liquid and gas flow, thus the blocking of gas by liquid when the apparatus is inclined is prevented. Moreover, the lower part of the conduit 25 is made to form an evaporative precooler 33. As seen particularly in FIG. 2, the precooler comprises a pipe which is flattened along a given part of its length, so that a vertical flat portion 34 and a lower channel 35 and an upper channel 36 are formed.

Figure 3:
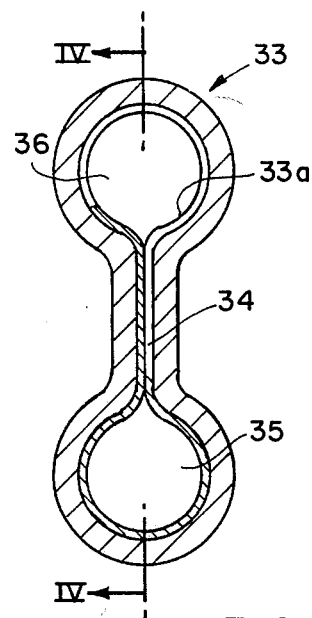
FIG. 3 is an enlarged vertical sectional view showing the evaporative precooler having helical grooves therein.
Figure 4:
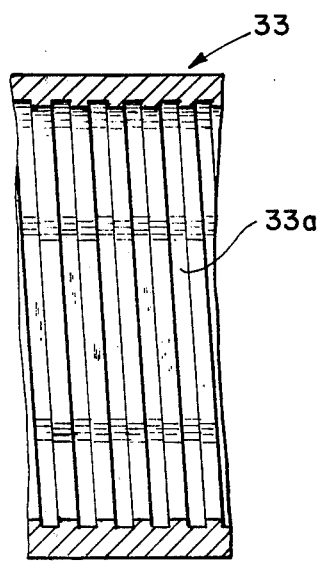
FIG. 4 is a partial longitudinal sectional view taken along the lines IV—IV of FIG. 3.

As seen particularly in FIGS. 3 and 4, the evaporative precooler 33 is provided with an inner wall having a circular or helical groove 33a. This circular or helical groove 33a is so constructed that the condensate flowing in the lower channel 35 of the pipe is elevated by capillary force in the helical grooves and moistens or wets additionally the inner pipe wall of the upper channel 36. Furthermore, the largest part of the weak gas passing through the conduit 28 returns back to the absorber 17 through the evaporator system 27, 26. However, a small part of the weak gas flows upwardly through the precooler 33 and passes through the upward channel 36 in which a partial evaporation of the refrigerant occurs. Furthermore, the gas mixture which is thus obtained is conducted from the upper end of the precooler 33 through a conduit 37 back to gas circulation in the gas heat exchanger 29 (FIG. 1).

The upper part 38 of the condensate conduit 25 is formed by a pipe similar in construction to that of the precooler 33. It will be noted that the upper part 38 has a flattened central portion 39, a lower channel 40 for condensate and an upper channel 41. The upper channel functions to vent the inert gas and any refrigerant vapor from the condenser which may not have been condensed.

It should be evident that the pressures in the condenser and other apparatus parts will be equalized since it is possible for the vapor and the inert gas to pass through the channel 41 and through the condensate conduit 25 to the conduit 37 without being blocked by liquid. In order to obtain this flow of the gas mixture the resistence to the gas is greater in the upper channel 36 of the precooler than the resistance to the flow in the conduit 37. Thus, the conduit 37 can be of such a size that the risk of liquid plugs which prevent the circulation of gas through the precooler is substantially reduced. If such liquid plugs are formed, they can be easily removed so that the gas starts circulating to the precooler as desired. In order to obtain a startup of the apparatus with gas flow in the correct direction the upper channel 36 of the precooler 33 should have such a construction arrangement that its highest point is generally at the same level as the highest point of the conduit 37.

Furthermore, the interior grooves in the precooler not only provide a large moistened area of the pipe wall in the upper channel 36 in a large contact surface for both liquid and gas, as described hereinbefore, but also prevents the forming of liquid plugs in the part of the apparatus which has a comparatively small cross-section in which could be a problem with regard to gas circulation.

The precooling procedure takes place in two stages. In the first stage, which occurs in the flattened portion 34 of the precooler 33, the condensate is cooled in a lower channel 35 by heat exchange with the upper channel 36 which is cooled by evaporation of the refrigerant. Condensate is then raised in the capillary grooves 3a in the pipe wall, and during the movement of the condensate assumes a lower temperature which is close to the temperature in the upper channel 36. Thus, the difference in pressure of condensate or refrigerant vapor is small. Furthermore, it is possible to determine the evaporation area of the channel by making the channel with a predetermined diameter and/or suitable length so that it is possible to operate with balanced temperatures of the condensate and rich gas mixture before the latter exits from the precooler.

The flattened portion 34 of the precooler 33 does not extend as far as to the upper end 32 of the evaporator 27 but between the parts is a section 42 in which condensate from the lower channel 35 and gas mixture from the upper channel 36 are brought into direct contact with one another before the condensate is conducted into the evaporator 27. In addition this part of the pipe has grooves so that the surface of the pipe wall above the condensate is entirely moistened by the condensate. In this manner a large evaporation area is obtained and within a short length the condensate is cooled down to a temperature corresponding to the partial pressure of the condensate in the weak gas. The above described arrangement and construction avoids the stirring of gas or condensate which would have the undesirable effect of increased losses in the precooler. Moreover, the precooler is so constructed that it can readily adapt to different types and sizes of refrigerating devices.

What is claimed is:

1. In an absorption refrigerating apparatus operating with a pressure-equalizing inert gas comprising: an evaporative precooler having two parallel flow paths that are separated from each other by means which heat conductively connects said flow paths to one another, one of said flow paths being located below the other and forming a conduit for the condensate accumulating when said apparatus is operative, the other of said flow paths being situated at a higher level forming a conduit for the partial flow of weak gas, and means being provided for raising the condensate to said weak gas conduit and to moisten the inner wall of said weak gas conduit with said condensate, said means being a channel that extends substantially perpendicular to the longitudinal axes of said parallel flow paths.

2. In the apparatus as claimed in claim 1 further comprising an evaporator and a vent conduit, and said parallel flow paths in said precooler being oriented to incline towards said evaporator, and said flow paths at their upper ends being joined together at a point from which said vent conduit extends to a point in the gas circulation system of the apparatus that is located below said evaporator.

3. In an apparatus as claimed in Claim 2 wherein said parallel flow paths are formed by a pipe that is flattened along at least a part of its length to form said channel and whereby upper and lower conduits are formed connected by said channel.

4. In an apparatus as claimed in claim 3 wherein said flat portion extends from a location adjacent to one end of said evaporator to a place adjacent to the connection of said vent conduit where said flow paths are joined together.

5. In an apparatus as claimed in claim 2 wherein said vent conduit has a flow resistance restricting the flow of gas therethrough.

6. In an apparatus as claimed in claim 2 wherein the highest point of the vent conduit is located higher than the highest point in the flow path for the gas in said precooler.

7. In an apparatus as claimed in claim 2 further comprising a condenser and condensate conduit positioned between said precooler and condenser, said condensate conduit including two parallel flow paths, one of which contains gas and the other contains condensate, and the gas conduit has greater flow resistance than said vent conduit.

8. In an apparatus as claimed in claim 7 wherein said other conduit forming the upper flow path is moistened by said condensate and a small part of the weak gas flows therethrough.

9. In an apparatus as claimed in claim 3, wherein the inner wall of the pipe is provided with a helical groove, whereby the condensate flowing in the lower flow path is elevated by capillary force to the inner wall of the upper flow path conducting gas.

* * * * *